United States Patent
Weals et al.

(10) Patent No.: US 7,050,000 B2
(45) Date of Patent: May 23, 2006

(54) RADAR BASED APPLICATION PROGRAMMABLE WAVEFORM GENERATOR COMPONENT

(75) Inventors: Garth Ernest Weals, Newbury Park, CA (US); Yair Alon, Thousand Oaks, CA (US); Fred William Erickson, Agoura Hills, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 10/643,548

(22) Filed: Aug. 19, 2003

(65) Prior Publication Data
US 2005/0040984 A1 Feb. 24, 2005

(51) Int. Cl.
G01S 7/02 (2006.01)
G01S 7/40 (2006.01)
G01S 13/00 (2006.01)
G01S 13/74 (2006.01)

(52) U.S. Cl. ............... 342/195; 342/42; 342/45; 342/82; 342/165; 342/173; 342/174; 342/175; 342/194; 708/270; 708/271; 327/105; 327/107

(58) Field of Classification Search ........ 708/230–277; 327/100, 105, 106, 107, 131, 164; 342/36–51, 342/84, 175, 195, 196, 200–205, 82–88, 342/165–174, 194; 375/260
See application file for complete search history.

(56) References Cited

U.S. PATENT DOCUMENTS

| | | | | |
|---|---|---|---|---|
| 3,822,380 A | * | 7/1974 | Forgione | 708/272 |
| 4,200,872 A | * | 4/1980 | Sifferlen et al. | 342/84 |
| 4,303,837 A | * | 12/1981 | Ansaldi et al. | 327/131 |
| 4,625,177 A | * | 11/1986 | Conway et al. | 327/105 |
| 4,633,198 A | * | 12/1986 | Goetz et al. | 342/200 |
| 4,881,190 A | * | 11/1989 | Priatko et al. | 708/272 |
| 5,502,499 A | * | 3/1996 | Birch et al. | 327/106 |
| 6,304,611 B1 | * | 10/2001 | Miyashita et al. | 375/260 |
| 6,392,588 B1 | * | 5/2002 | Levanon | 342/202 |

* cited by examiner

Primary Examiner—Bernarr E. Gregory
(74) Attorney, Agent, or Firm—Patti & Brill LLC (57) ABSTRACT

An exemplary radar system includes a waveform generator that generates a control waveform. An in-phase and quadrature modulator receives the control waveform from the waveform generator and in turn generates a waveform output that is amplified by a power amplifier before being transmitted from an antenna.

17 Claims, 8 Drawing Sheets

RADAR BASED APPLICATION PROGRAMMABLE WAVEFORM GENERATOR COMPONENT

TECHNICAL FIELD

The invention relates generally to electronic equipment and more particularly to waveform generators for radar based applications.

BACKGROUND

Airlines and government agencies employ radar based applications to identify objects. The radar based applications comprise capabilities for selective identification feature ("SIF") interrogation, identify friend or foe ("IFF"), and transponder pulse generation. For example, the radar based applications are responsible for generation of one or more pulse trains.

Requirements for waveform generators for radar based applications have increased in recent years. The requirements in one example apply to Mode S and Mode 5 waveforms. One shortcoming of existing waveform generators is an inability to precisely control the amplitude and the phase of the waveforms.

The Federal Aviation Administration ("FAA") imposes strict requirements for frequency spectrum usage on airlines and government agencies. For example, the strict spectrum requirements require precise waveform signal transmission. The existing waveform generators utilize a simple on/off modulation for waveform signal transmission. As another shortcoming, this simple on/off modulation can interfere with precise waveform signal transmission.

Thus, a need exists for enhanced control of phase and amplitude of one or more parts of a waveform in one or more radar based applications.

SUMMARY

The invention in one implementation encompasses an apparatus. The apparatus comprises a radar based application programmable waveform generator component that generates a waveform and controls a phase and an amplitude of one or more parts of the waveform.

Another implementation of the invention encompasses a method. One or more parts of a waveform are generated by a radar based application programmable waveform generator component. One or more values of one or more of an in-phase signal and an quadrature signal are controlled to generate one or more of the one or more parts of the waveform.

A further implementation of the invention encompasses an article. The article comprises one or more computer-readable signal-bearing media. The article comprises means in the one or more media for generating one or more parts of a waveform by a radar based application programmable waveform generator component. The article comprises means in the one or more media for controlling one or more values of one or more of an in-phase signal and an quadrature signal to generate one or more of the one or more parts of the waveform.

DESCRIPTION OF THE DRAWINGS

Features of exemplary implementations of the invention will become apparent from the description, the claims, and the accompanying drawings in which:

DETAILED DESCRIPTION

Figure 1:
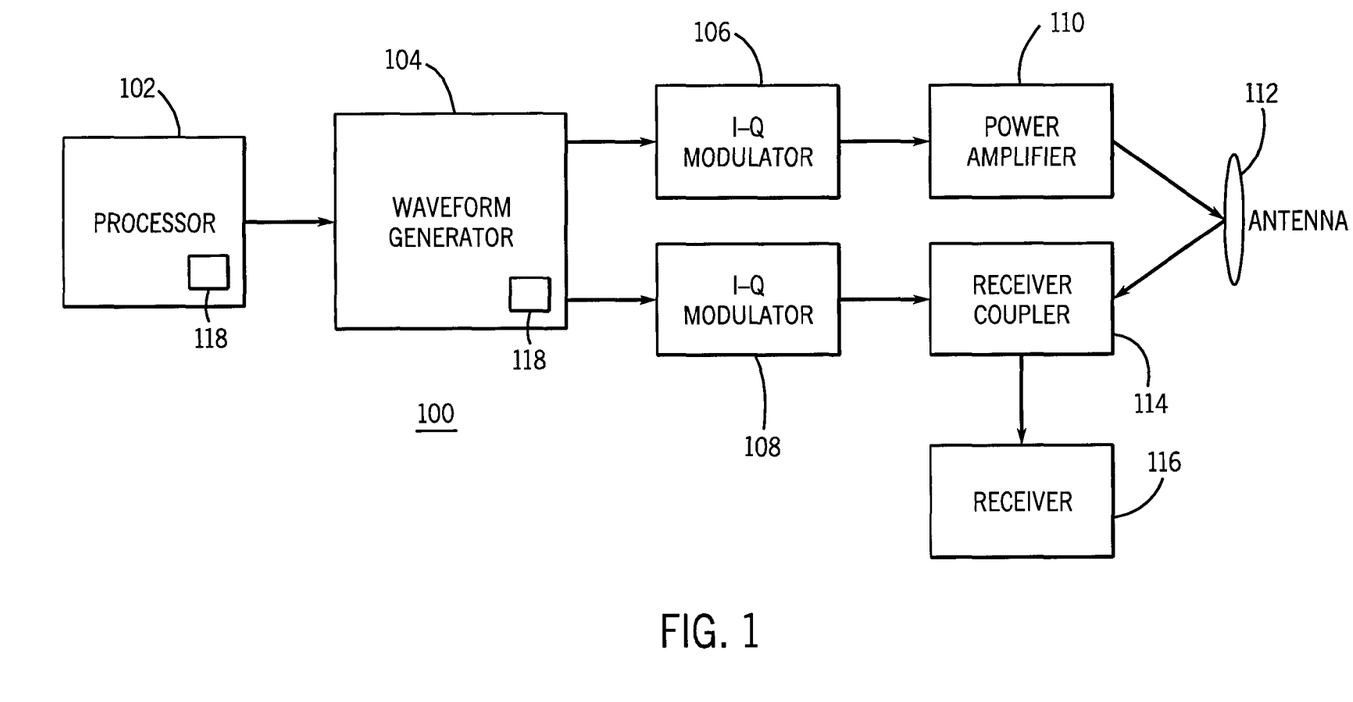
FIG. 1 is a representation of an exemplary implementation of an apparatus that comprises one or more processor components, one or more waveform generator components, one or more modulators, one or more amplifiers, one or more antennas, one or more receiver couplers, and one or more receivers.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more processor components 102, one or more waveform generator components 104, one or more modulators 106 and 108, one or more amplifiers 110, one or more antennas 112, one or more receiver couplers 114, and one or more receivers 116. The apparatus 100 in one example comprises a radar based application. For example, the radar based application comprises an identification friend or foe ("IFF") interrogator. The waveform generator component 104 in one example generates a waveform, for example, a waveform 304. The receiver 116 employs one or more parts of the waveform 304 to identify a source of the waveform 304. For example, a ground based receiver identifies an aircraft carrying the wavefrom generator component 104 through employment of one or more parts of the waveform 304. The one or more parts of the waveform 304 in one example comprise one or more of an in-phase signal 306 and a quadrature signal 308. The waveform 304 in one example comprises one or more modes. For example, the waveform generator component 104 generates a waveform analogous to the waveform 304 for mode 5 and mode S radar based applications, as will be appreciated by those skilled in the art.

Figure 2:
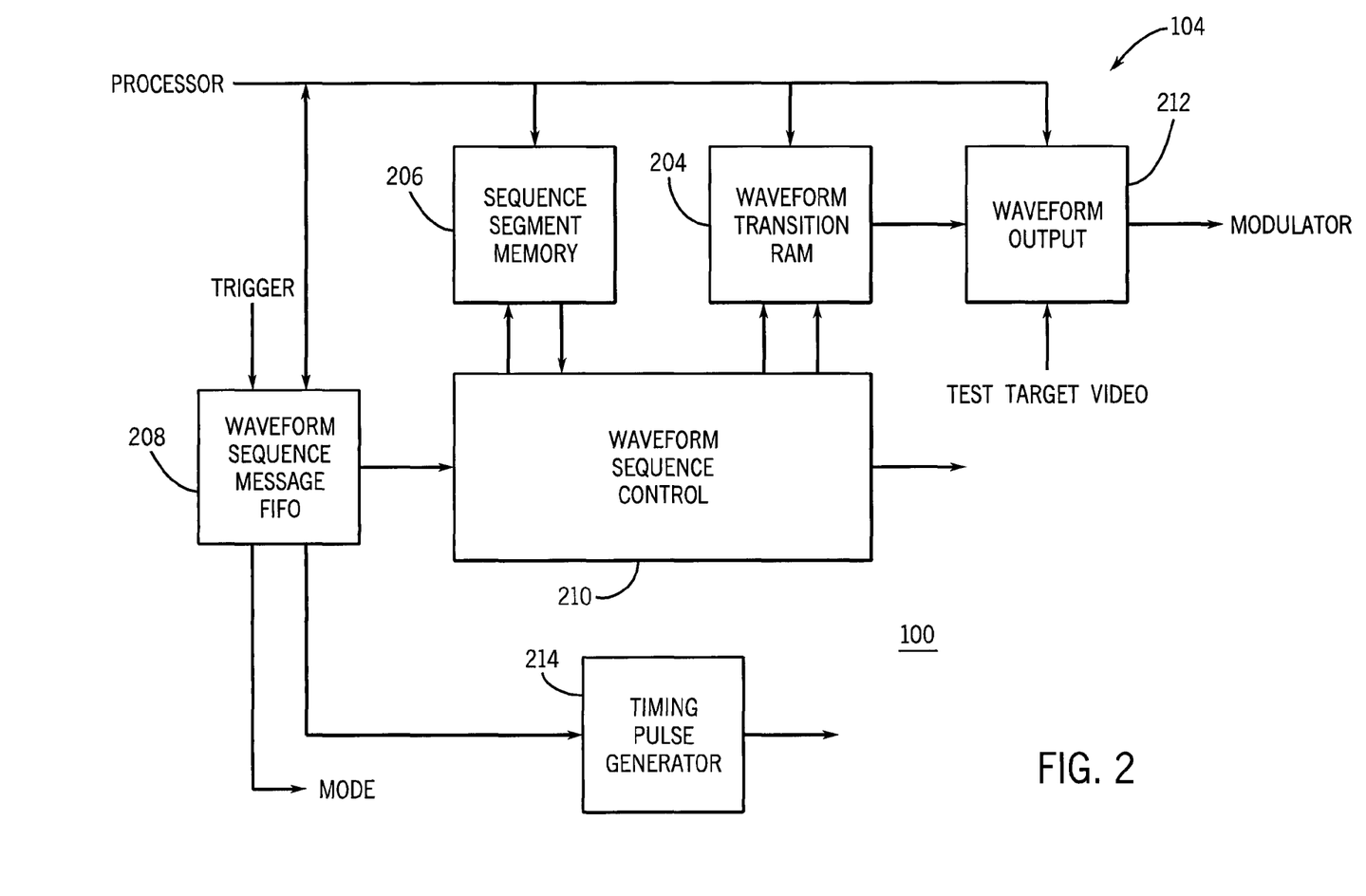
FIG. 2 is a representation of an exemplary implementation of the waveform generator component of the apparatus of FIG. 1, and illustrates a waveform transition memory component, a sequence segment memory component, a first in first out components, a control component, a waveform output component, and a timing pulse generator component.
Figure 3:
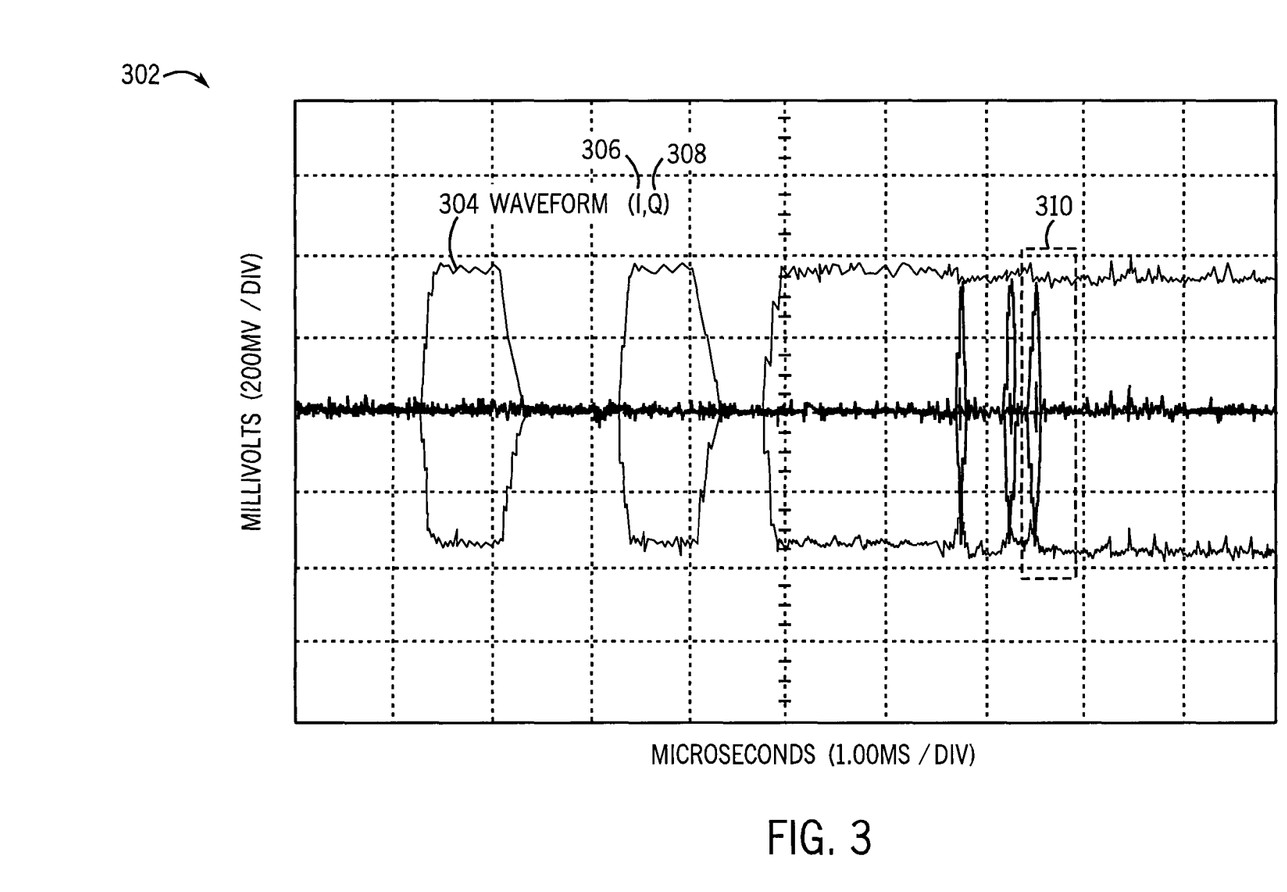
FIG. 3 is a representation of one example of a waveform with an in-phase signal and a quadrature signal formed by the waveform generator component of FIG. 1.

Referring to FIGS. 1–3, the waveform generator component 104 comprises one or more memory components, for example, one or more waveform transition memory components 204 and one or more sequence segment memory components 206, one or more first in first out ("FIFO") components 208, one or more control components 210, one or more waveform output components 212, and one or more timing pulse generator components 214. The processor component 102 sends instructions to the waveform generator component 104 to generate the waveform analogous to the waveform 304. The waveform generator component 104 in one example is programmable. For example, the waveform generator component 104 employs the instructions to control a phase and an amplitude of one or more pulses of the waveform analogous to the waveform 304.

The processor component 102 sends the instructions through a peripheral component interconnection ("PCI") bus 205. The instructions in one example comprise one or more of a waveform transition segment, a waveform sequence segment, and a sequence message. The processor component 102 sends the waveform transition segments, the waveform sequence segments, and the sequence messages to one or more of the waveform transition memory component 204, the sequence segment memory component 206, and the first in first out component 208.

The waveform transition memory component 204 in one example stores the waveform transition segments. For example, the waveform transition segments comprise one or more waveform portions 310. The waveform generator component 104 employs a plurality of the waveform portions 310 to form the waveform 304. The waveform generator component 104 employs one or more of the in-phase signal 306 and the quadrature signal 308 to control one or more of a phase ("φ") and an amplitude ("A") of the waveform 304. Now are presented exemplary equations representative of an illustrative relationship between an in-phase control signal analogous to the in-phase signal 306, a quadrature control signal analogous to the quadrature control signal 308, a radio frequency amplitude, and a phase.

$$I = A \cos \phi$$

$$Q = A \sin \phi$$

$$A = \sqrt{I^2 + Q^2}$$

$$\varphi = \mathrm{Arctan}\left(\frac{Q}{I}\right)$$

The waveform transition memory component 204 in one example comprises a waveform transition random access memory ("RAM") component. When a transition to a new phase and/or amplitude is to occur in the waveform analogous to the waveform 304, the waveform transition memory component 204 supplies one or more of an in-phase signal analogous to the in-phase signals 306 and a quadrature signal analogous to the quadrature signals 308 to the waveform output component 212. The sequence segment memory component 206 in one example employs the waveform sequence segments to make a determination of the transition waveform segments to form the waveform analogous to the waveform 304.

The sequence segment memory component 206 stores the waveform sequence segments. The sequence segment memory component 206 in one example employs the waveform sequence segments to make a determination of one or more waveform portions analogous to the waveform portions 310 to form the waveform analogous to the waveform 304. The waveform sequence segments comprise one or more of a transition address, a segment length, a transition function, a discrete selector bit, and an end of waveform sequence bit. For example, the sequence segment memory component 206 employs the waveform sequence segments to make a determination of the waveform transition segments to add to the waveform analogous to the waveform 304, maintain an amplitude and/or a phase of one or more parts of the waveform analogous to the waveform 304, and switch on or off one or more discrete parts of the waveform analogous to the waveform 304.

Where the waveform sequence segment comprises the transition address, the sequence segment memory component 206 employs the waveform sequence segment to make a determination of a waveform transition segment analogous to the waveform portion 310 from the waveform transition memory component 204. Where the waveform sequence segment comprises the segment length, the sequence segment memory component 206 employs the waveform sequence segment to determine a length of a segment to form the waveform analogous to the waveform 304. In one example, the waveform transition memory component 204 runs on a 64 MHz clock. In another example, one or more of the sequence segment memory component 206 and the control component 210 run on a 32 MHz clock.

Where the waveform sequence segment comprises the transition function, the sequence segment memory component 206 employs the waveform sequence segment to make a determination of a function to form the waveform analogous to the waveform 304. In one example, the function causes the waveform analogous to the waveform 304 to remain flat after a waveform transition segment. For example, the function causes an amplitude to remain at one level for the waveform analogous to the waveform 304. In another example, the function causes an unconditional waveform transition. The unconditional waveform transition causes a change in amplitude for the waveform analogous to the waveform 304. For example, the unconditional waveform transition is not dependent on a shift register of the sequence segment memory component 206. In yet another example, the function causes one or more of a conditional waveform transition, a selective transition, and a transition to zero state. The one or more of a conditional waveform transition, a selective transition, and a transition to zero state cause a change in amplitude for the waveform analogous to the waveform 304. For example, the one or more of a conditional waveform transition, a selective transition, and a transition to zero state are dependent on the shift register of the sequence segment memory component 206. In still another example, the function causes the first in first out component 208 to send a sequence message to the control component 210.

Where the waveform sequence segment comprises the discrete selector bit and where the waveform sequence segment to causes the waveform analogous to the waveform 304 to remain flat after a waveform transition segment, the sequence segment memory component 206 employs the waveform sequence segment to make a determination of an employment of one or more of a modulator 106 or 108, an interrogator side lobe suppression ("ISLS") switch, and a system monitor. In one example, the sequence segment memory component 206 employs the waveform sequence segment to make a determination of one or more of the modulators 106 and 108. For example, the one or more of the modulators 106 and 108 receive the waveform analogous to the waveform 304 from the waveform generator component 104. In another example, the sequence segment memory component 206 employs one or more of the interrogator side lobe suppression bit and the system monitor select bit to enable the modulators 106 and 108 to receive the waveform analogous to the waveform 304. In yet another example, the sequence segment memory component 206 employs one or more of the interrogator side lobe suppression bit and the system monitor select bit to disable the modulators 106 and 108. For example, the modulators 106 and 108 are not able to receive the waveform analogous to the waveform 304.

The first in first out component 208 in one example manipulates one or more sequence messages in preparation of waveform generation. For example, the first in first out component 208 employs the sequence messages to communicate with one or more of the timing pulse generator component 214 and the control component 210. The one or more of the timing pulse generator component 214 and the control component 210 make a determination of the waveform portions analogous to the waveform portions 310 for generation of the waveform analogous to the waveform 304. The sequence messages in one example comprise one or more types. The first in first out component 208 employs the types of the sequence messages to communicate to the one or more of the timing pulse generator component 214 and the control component 210 one or more of a timing control, a sequence data, a memory address, and a sequence control for waveform generation.

Where the first in first out component 208 communicates the timing control to one or more of the control component 210 and the timing pulse generator component 214, the first in first out component 208 employs the sequence messages to select one or more timing functions. The timing functions comprise one or more of a load frame time, a frame number wait, a load interrogation mode, and a load timing pulse. In one example, the first in first out component 208 employs the load frame time to determine a length of the frame. For example, the control component 210 employs the length of the frame to make a determination of a number of the waveform portions analogous to the waveform portions 310 of the waveform analogous to the waveform 304. In another example, the frame number wait causes the first in first out component 208 to wait for a specific frame number. For example, the first in first out component 208 waits for the specific frame number to send a sequence message to the control component 210.

Where the timing function comprises the load timing pulse, the first in first component 208 sends one or more timing signals to the timing pulse generator component 214. Upon receipt of the timing signals, the timing pulse generator component 214 creates a timing counter. The timing pulse generator component 214 in one example sets the timing counter to zero at the start of a frame. The timing pulse generator component 214 determines a value of time. In one example, when the timing counter reaches the value of time, the timing pulse generator component 214 generates one or more timing pulses to indicate a mode of waveform generation, for example, a mode S waveform generation. In another example, where the timing function comprises the load interrogation mode, the first in first out component employs changes the mode of waveform generation.

Where the first in first component 208 communicates one or more of the sequence data and the memory address to the control component 210, the control component 210 makes a determination of the waveform portions analogous to the waveform portions 310 of the waveform analogous to the waveform 304. In one example, the control component 210 employs the sequence data to make the determination of the waveform portions analogous to the waveform portions 310 of the waveform analogous to the waveform 304. In another example, the control component 210 employs the memory address to access a waveform sequence segment from the sequence segment memory component 206 to make the determination of the waveform portions analogous to the waveform portions 310 of the waveform analogous to the waveform 304.

Where the first in first out component 208 communicates the sequence control to the control component 210, the first in first out component sends a last sequence message to the control component 210. In one example, the first in first out component 208 employs the sequence message to identify a start time of waveform generation. For example, when a frame counter of the first in first out component 208 reaches the start time, the first in first out component 208 employs the start time to send the sequence message to the control component 210. In another example, the control component 210 employs the sequence message to enable one or more of the modulators 106 and 108, the system monitor, and the power amplifier component 110 to create one or more radio frequency signals from the waveform analogous to the waveform 304.

The control component 210 in one example transfers one or more of the waveform transition segments, the waveform sequence segments, and the sequence messages between the memory components 204 and 206 and the first in first component 208. For example, the control component 210 controls the execution of the one or more of the waveform transition segments, the waveform sequence segments, and the sequence messages to make a determination of the waveform portions 310 of the waveform analogous to the waveform 304.

Figure 4:
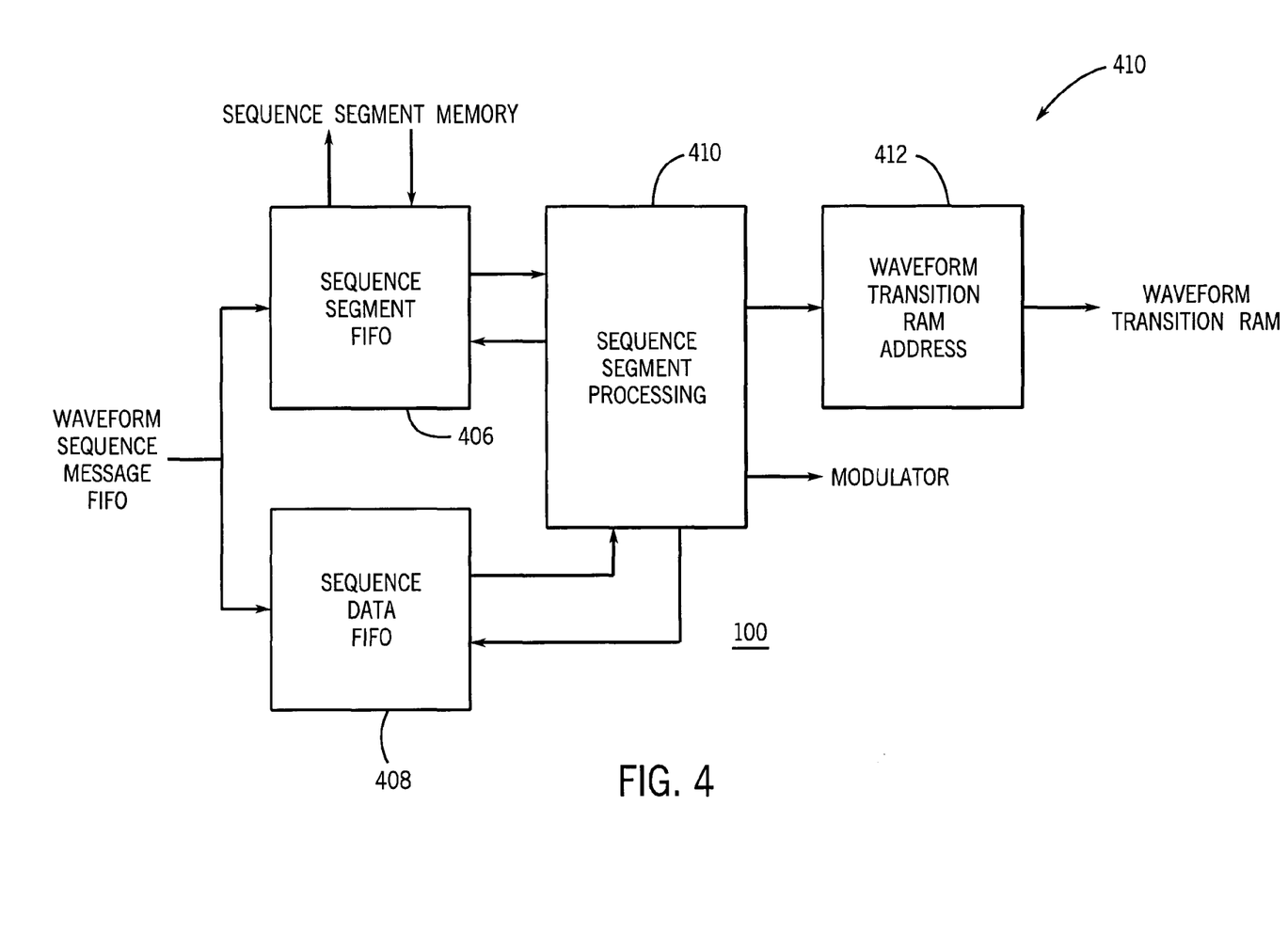
FIG. 4 is a representation of an exemplary implementation of the control component of the apparatus of FIG. 2.

Referring to FIGS. 2–4, the control component 210 in one example comprises one or more first in first out components 406 and 408, one or more processor components, for example, one or more sequence segment processing components 410, and one or more logic components 412. One or more of the first in first out components 406 and 408 in one example access one or more sequence messages from the first in first out component 208. In a first example, one or more of the first in first out components access one or more of a data word and a memory address of the sequence message. In a second example, the first in first out component 406 accesses a memory address of the sequence message and the first in first out component 408 accesses a data word of the sequence message. In a third example, the first in first out component 406 accesses a data word of the sequence message and the first in first out component 408 accesses a memory address of the sequence message. In a fourth example, the first in first out component 406 accesses one or more of a first data word and a first memory address. In a fifth example, the first in first out component 408 accesses one or more of a second data word and a second memory address.

The first in first out component 406 in one example enables communication between the first in first out component 208, the sequence segment memory component 206, and the sequence segment processing component 410. For example, the first in first out component 406 accesses the memory address of the sequence message from the first in first out component 208. The memory address in one example corresponds to a waveform sequence segment of the sequence segment memory component 206. For example, the waveform sequence segment comprises one or more instructions. The control component 210 employs the instructions to make a determination of the waveform portion analogous to the waveform portion 310 for waveform generation. Upon receipt of the memory address, the sequence segment memory component 206 in one example sends one or more waveform sequence segments to the first in first out component 406. For example, the first in first out component 406 performs a memory read from the sequence segment memory component 206. The first in first out component 406 stores the one or more waveform sequence segments.

Upon receipt of the one or more waveform sequence segments, the first in first out component 406 sends the one or more waveform sequence segments to the sequence segment processing component 410. Upon receipt of the one or more waveform sequence segments at the sequence segment processing component 410, the first in first out component 406 performs a memory read from the sequence segment memory component 206. For example, the first in first out component 406 refills the memory with one or more waveform sequence segments.

The first in first out component 408 in one example enables communication between the first in first out component 208 and the sequence segment processing component 410. For example, the first in first out component 408 accesses the data word of the sequence message from the first in first out component 208. Upon receipt of the data word, the first in first out component 408 sends the data word to the sequence segment processing component 410.

The sequence segment processing component 410 comprises one or more shift registers and one or more counters. In one example, the first in first out component 408 sends the data word to the sequence segment processing component 410 to update the shift registers. In another example, the first in first out component 408 sends the data word to the sequence segment processing component 410 to update the counters. In yet another example, the sequence segment processing component 410 creates one or more enable signals. For example, one or more of the shift register and the counter determine the enable signals. The sequence segment processing component 410 sends the enable signals to one or more of the modulators 106 and 108 to allow the one or more of the modulators 106 and 108 to receive the waveform analogous to the waveform 304 upon waveform generation.

Upon receipt of one or more of the data word and the waveform sequence segment, the sequence segment processing component 410 in one example performs one or more transition functions. For example, the sequence segment processing component 410 employs the one or more of the data word and the waveform sequence segment to cause an amplitude change between two consecutive waveform portions analogous to the waveform portions 310. The logic component 412 in one example employs the transition functions of the waveform sequence segments to make a determination of the two consecutive waveform portions analogous to the waveform portions 310.

The first in first out component 406 in one example sends a first waveform sequence segment to the sequence segment processing component 410 to update one or more of a length register and a length counter of the sequence segment processing component 410. When the length counter reaches a value of zero, the sequence segment processing component 410 sends an advance segment pulse to the first in first out component 406. Upon receipt of the advance segment pulse, the first in first out component 406 in one example sends a second waveform sequence segment to the sequence segment processing component 410. Where a waveform sequence segment comprises the end of sequence bit, the sequence segment processing component 410 no longer reads the waveform sequence segment.

In one example, where a waveform sequence segment comprises the transition functions, the sequence segment processing component 410 in one example updates a transition counter with a transition address of the waveform sequence segment. For example, the sequence segment processing component 410 sends the transition address to the logic component 412 to update the transition counter of the logic component 412. The logic component 412 sends the address to the waveform transition memory component 204. The waveform transition memory component 204 employs the address to send the waveform transition segments to the waveform output component 212 to form the waveform analogous to the waveform 304.

In another example, the transition function comprises a "get data" function. For example, the sequence segment processing component 410 employs a data word from the first in first out component 408 to make a determination of one or more waveform portions analogous to the waveform portion 310 to form the waveform analogous to the waveform 304. In yet another example, the transition function comprises a "shift data" function. For example, the first in first out component 408 updates the sequence data shift register of the sequence segment processing component 410 for each data word read to make a determination of the waveform portions analogous to the waveform portion 310. In still another example, where the transition function comprises one or more of the conditional waveform transition, the selective transition, and the transition to zero state functions, the sequence segment processing component 410 updates one or more transition state counters to make a determination of a change in amplitude for the waveform analogous to the waveform 304.

Where the data word comprises a modulator enable bit and/or a transition function, the sequence segment processing component 410 in one example enables the waveform transition memory component 204 to output the waveform transition segments to the waveform output component 212. For example, the sequence segment processing component 410 creates a transition enable signal. The sequence segment processing component 410 sends the transition enable signal to the logic component 412. The logic component 412 employs the transition enable signal to enable the waveform transition memory component 204 to send the waveform transition segments to the waveform output component 212. The waveform output component 212 employs one or more of the waveform transition segments, the data word, the sequence data shift register, and the transition state counter to form the waveform analogous to the waveform 304. The waveform in one example comprises one or more waveform portions analogous to the waveform portion 310. Where the data word comprises one or more of the flat function or the conditional transition, the processor component 210 disables the transition enable signals. In one example, consecutive waveform portions have no change in amplitude. The waveform analogous to the waveform 304 in one example comprise one or more of the waveform portions and the consecutive waveform portions.

Upon a formation of the waveform analogous to the waveform 304 from the one or more of the waveform portions and the consecutive waveform portions, the sequence segment processing component 410 in one example creates a modulator enable signal for the modulators 106 and 108. The modulators 106 and 108 employ the modulator enable signal to receive the waveform analogous to the waveform 304 from the waveform output component 212.

Before sending the waveform analogous to the waveform 304 to the modulators 106 and 108, the waveform output component 212 manipulates the waveform analogous to the waveform 304. In one example, the waveform output component 212 scales the waveform analogous to the waveform 304 in binary form for receipt by the modulator 106. In another example, the waveform output component 212 sends one or more online test targets to the modulator 108. For example, the modulator 108 employs the online test targets to alter one or more of an in-phase signal and a quadrature signal analogous to the in-phase signal 306 and quadrature signal 308 of the waveform 304.

The modulator 106 in one example receives the waveform analogous to the waveform 304 from the waveform generator component 104. The waveform analogous to the waveform 304 comprises one or more of an in-phase control signal and a quadrature control signal analogous to the in-phase signal 306 and quadrature signal 308 of the waveform 304. The modulators 106 in one example employ the one or more of the in-phase control signal and the quadrature control signal to determine one or more of a phase and an amplitude of the waveform analogous to the waveform 304. For example, one or more of the modulators 106 and 108 perform a conversion of the in-phase control signals analogous to the in-phase signal 306 and the quadrature control signals analogous to the quadrature control signal 308 to one or more radio frequency signals ("RF"). The modulator 106 modulates the radio frequency signals to drive one or more of the power amplifiers 110.

The power amplifier 110 sends the radio frequency signal to the antenna 112. In one example, the antenna 112 transmits one or more signals from the receiver coupler 114 to a surveillance area. In another example, the modulator 108 receives the online test targets from the waveform generator component 104. The modulator 108 employs the online test targets to modulate the radio frequency signals for the receiver coupler 114. The modulator 108 sends the radio frequency signals to the receiver coupler 114. The receiver coupler 114 in one example employs one or more of the waveform analogous to the waveform 304 and the radio frequency signal to send a signal to the receiver 116.

Figure 5:
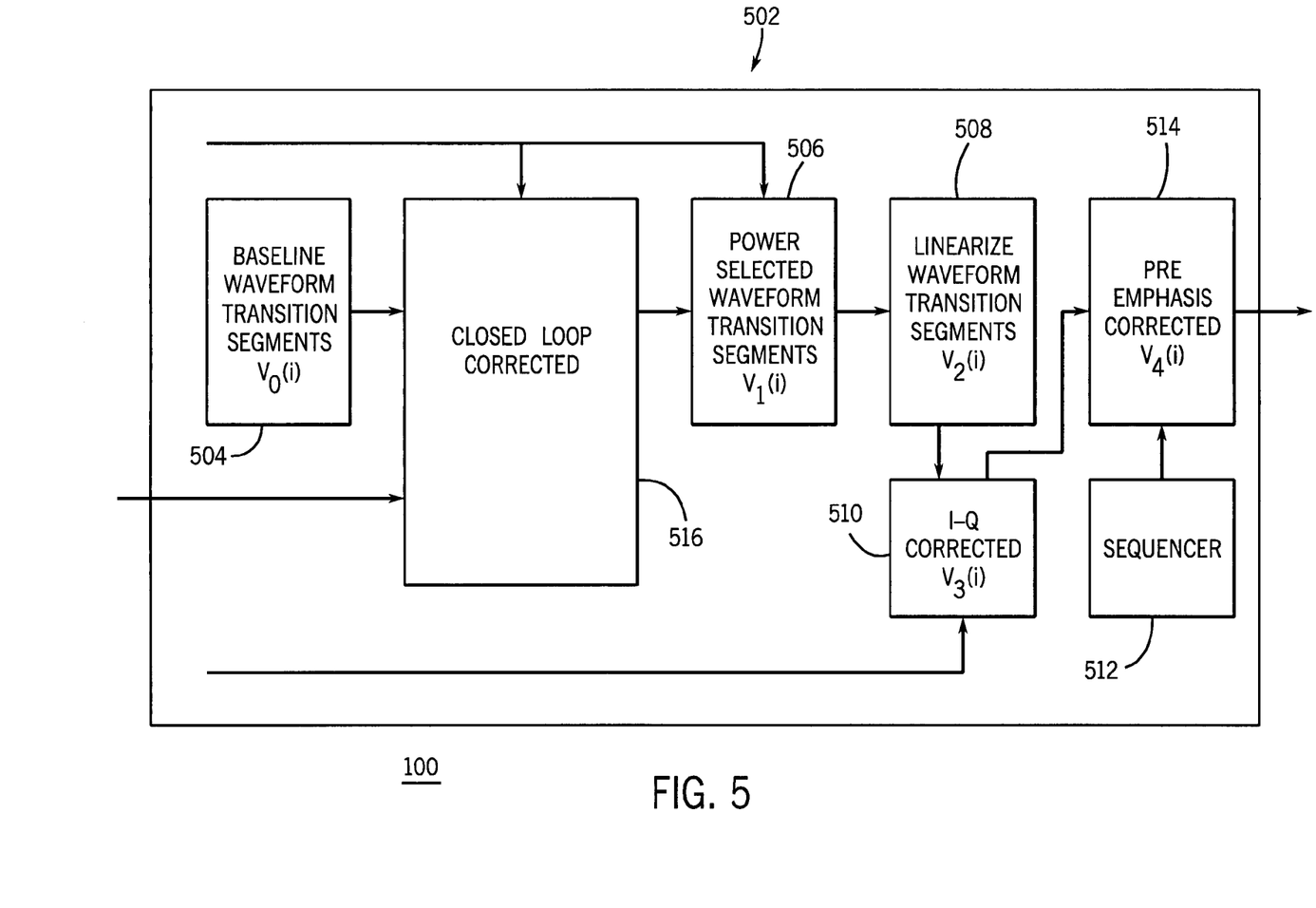
FIG. 5 is a representation of an exemplary message flow from signal conditioning of a waveform by one or more of the processor components, the waveform generator components, and the power amplifiers of the apparatus of FIG. 1.

Referring to FIGS. 1 and 5, one or more of the processor component 102, the waveform generator component 104, the modulators 106 and 108, and the power amplifier 110 employ one or more signal processor components to support signal conditioning of the waveform analogous to the waveform 304. Message flow 502 represents an exemplary employment of the signal processor components on the waveform by the one or more of the processor component 102, the waveform generator component 104, the modulators 106 and 108, and the power amplifier 110. The waveform generator component 104 in one example modifies a baseline waveform transition segments ("$V_0$") table 504 to one or more new waveform transition segment tables. For example, one or more values of the baseline waveform transition segments table are altered to generate the waveform analogous to the waveform 304. The baseline waveform transition segments table 504 comprises one or more waveform transition segments that are stored as one or more of an initial in-phase ("$I_0$") signal and an initial quadrature ("$Q_0$") signal in the waveform transition memory component 204.

The one or more of the processor component 102, the waveform generator component 104, the modulators 106 and 108, and the power amplifier 110 create one or more distortions in one or more of the phase and the amplitude of the waveform analogous to the waveform 304. The signal processor components in one example allow control of the amplitude and the phase of the waveform analogous to the waveform 304 and/or decrease the distortions of the amplitude and the phase of the waveform analogous to the waveform 304.

In one example, the values of the baseline waveform transition segments table 504 are multiplied by one or more multiplication factors ("$K_1$") to change the amplitude of the values to form a new table. For example, the new table comprises the power selected waveform transition segments table 506. In one example, a user of the waveform generator component 104 may select the multiplication factor. For example, the multiplication factor can be set upon startup of the waveform generator component 104. The modulators 106 and 108 employ the power selected waveform transition segments table 506 to generate the radio frequency signal. Now are presented exemplary equations representative of the in-phase control signals and the quadrature control signals of the power selected waveform transition segments table 506.

$$I_1 = I_0 * K_1$$

$$Q_1 = Q_0 * K_1$$

$$V_1 = \sqrt{I_1^2 + Q_1^2} = K_1 * V_1$$

The power selected waveform transition segments table 506 can be generated as an open loop value provided by the waveform generator component 104 or as a result of a closed loop process 516. For the closed loop process 516, the multiplication factor is adjusted to generate the power selected waveform transition segments table 506. For example, the waveform generator component 104 employs the closed loop correction process to convert the power selected waveform transition segments table 506 to a closed loop corrected transition segments table 516. For example, the closed loop corrected transition segments table 516 comprise one or more of an in-phase control signal ("$I_1$") and a quadrature control signal ("$Q_1$").

In another example, the amplifier component 110 creates waveform non-linearity. The processor component 102 in one example employs one or more linearization factors ("$K_2$") to correct the non-linearity. The processor 102 in one example employs the linearization factors to convert the power selected waveform transition segments table 506 to a linearized waveform transition segments table ("$V_2$") 508. Now are presented exemplary equations representative of an illustrative relationship between one or more of an in-phase control signal ("$I_2$") and a quadrature control signal ("$Q_2$") of the linearized waveform transition segments table 508.

$$I_2 = I_1 * K_2$$

$$Q_2 = Q_1 * K_2$$

$$V_2 = \sqrt{I_2^2 + Q_2^2} = K_2 * V_2$$

In yet another example, the modulator 106 creates distortion when it receives the waveform analogous to the waveform 304 from the waveform generator component 104. In one example, the modulator 106 performs a conversion of the baseline waveform transition segments table 504, where the baseline waveform transition segments table comprises one or more radio frequency input signals, to one or more radio frequency output signals. For example, the radio frequency output signals comprise an I–Q corrected transition segments table 510. Where the waveform generator component 104 converts the waveform transition segments of the waveform analogous to the waveform 304 from one or more analog signals to one or more digital signals, the values of the baseline waveform transition segments table 504 in one example comprise a direct current ("DC") offset between one or more waveform transition segments of the waveform analogous to the waveform 304.

One or more I–Q correction factors ("ΔI, ΔQ") are employed at the baseline waveform transition segments table 504 to correct the DC offset generated by the waveform generator component 104. For example, the modulator 106 employs the I–Q correction factors to convert the linearized waveform transition segments table 508 to the I–Q corrected transition segments table 510. Now are presented exemplary equations representative of an illustrative relationship between one or more of an in-phase control signal ("$I_3$") and a quadrature control signal ("$Q_3$") of the I–Q corrected transition segments table 510.

$$I_3 = I_2 + \Delta I$$

$$Q_3 = Q_2 + \Delta Q$$

Figure 6:
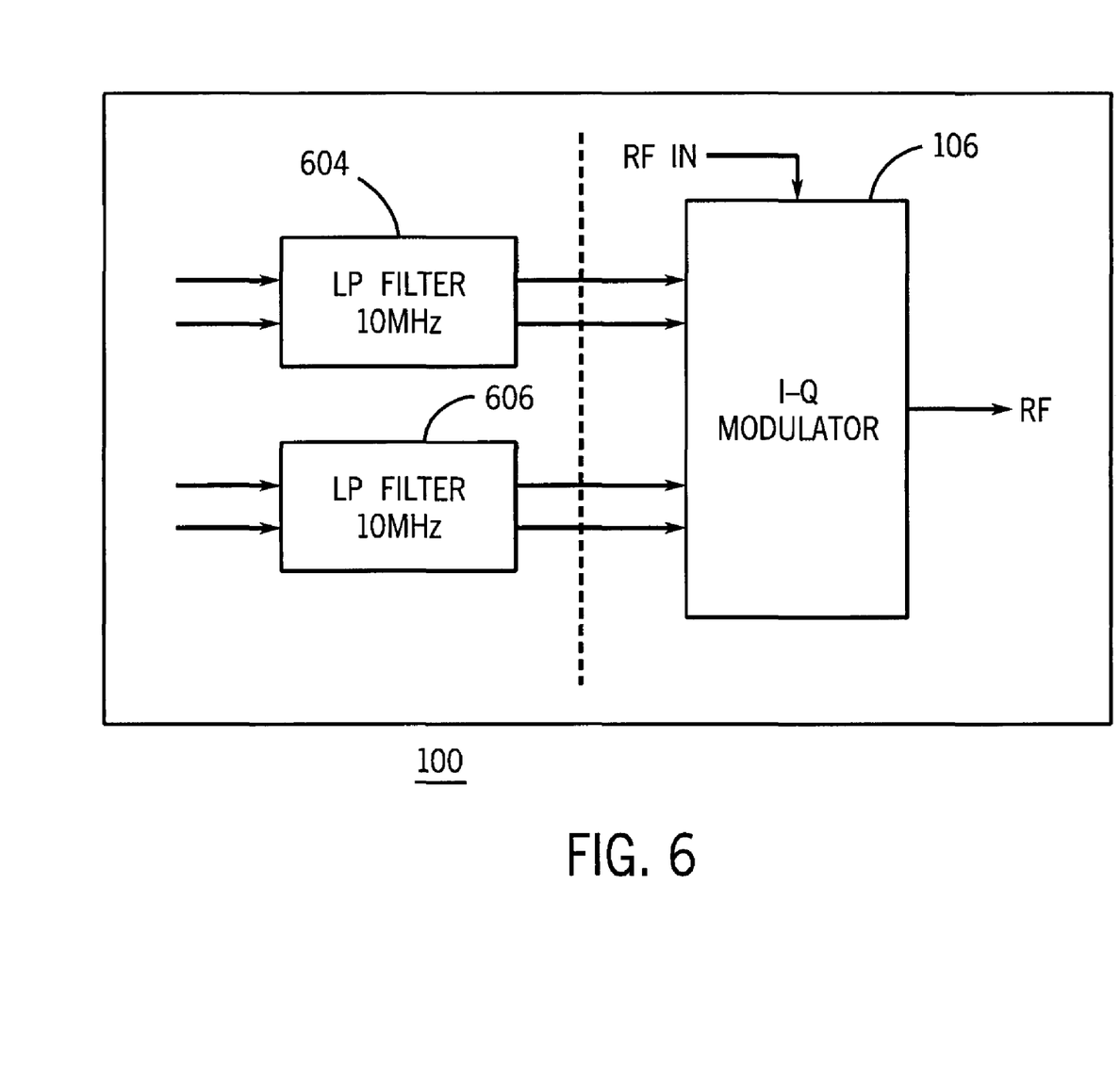
FIG. 6 is a representation of an exemplary implementation of the modulator of the apparatus of FIG. 1.

In still another example, referring to FIG. 6, the waveform generator component 104 sends the waveform analogous to the waveform 304 to one or more of the filters 604 and 606. The filters 604 and 606 in one example comprise one or more low pass filters. The modulator 106 receives one or more of the waveform analogous to the waveform 304 and the radio frequency signal from the filters 604 and 606. In one example, the filters 604 and 606 reduce a high 64 MHz sampling clock frequency of the waveform generator component 104 at the one or more of the waveform analogous to the waveform 304 and the radio frequency signal. In another example, a response of the filters 604 and 606 affects the phase and/or the amplitude of the waveform analogous to the waveform 304. For example, the response results in a distortion of the in-phase control signals and/or the quadrature control signals that affects the phase and/or amplitude of the radio frequency signal as generated by the modulators 604 and 606. The distortion comprises one or more of a decrease in amplitude of the quadrature and a delay of the in-phase of the waveform analogous to the waveform 304. The waveform generator component 104 converts the I–Q corrected transition segments table 510 to the pre-emphasis corrected transition segments table 514 to correct the distortion from the filters 604 and 606.

Figure 7:
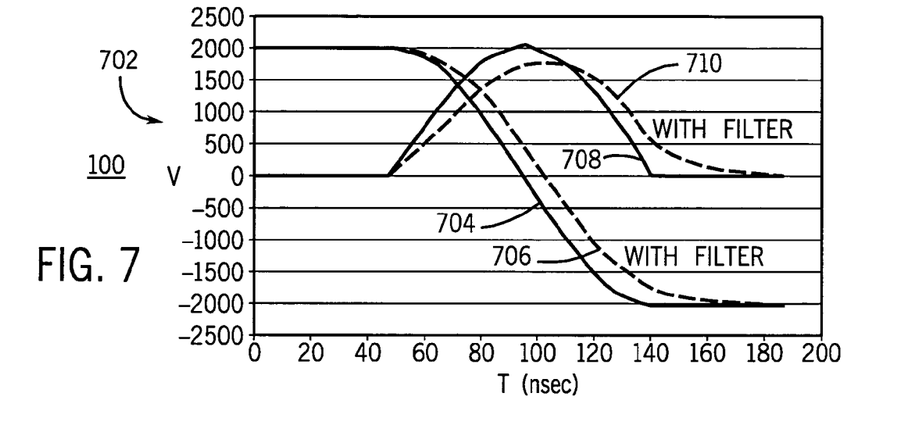
FIG. 7 is a representation of an exemplary plot of an effect of the modulator of the apparatus of FIG. 1 on another example of the waveform of FIG. 3.

Referring to FIG. 7, the plot 702 depicts one or more effects of the filters 604 and 606 on the waveform analogous to the waveform 304. The plot 702 depicts the effects of the filters 604 and 606 on one or more of an in-phase signal 704 and a quadrature signal 708 of the waveform analogous to the waveform 304 in volts versus nanoseconds. The filters 604 and 606 in one example comprise a low-pass filter with a cutoff frequency of 10 MHz. The waveform analogous to the waveform 304 in one example comprises a part of a mode S waveform for a 0° to 180° phase transition. In one example, the filters 604 and 606 cause a delay in time of the in-phase signal 704. In another example, the filters 604 and 606 cause a delay in a quadrature signal 708. For example, the delay results in a lower amplitude quadrature signal 710 and a time delayed in-phase signal 706.

Figure 8:
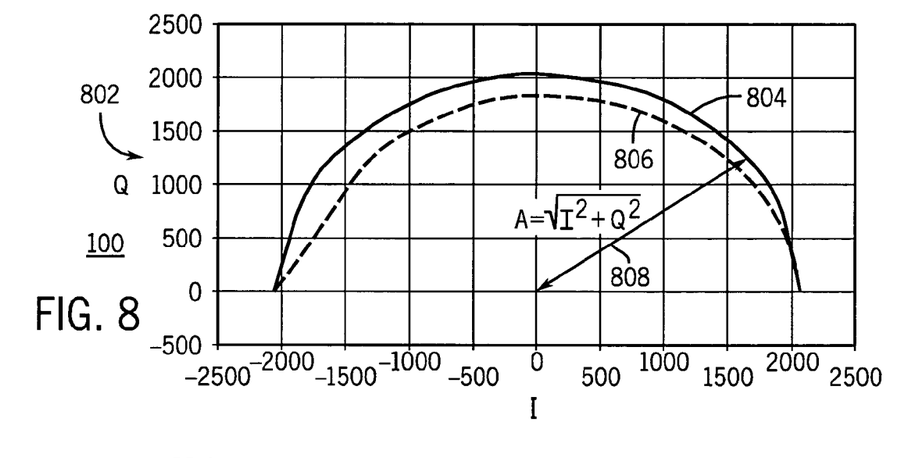
FIG. 8 is a representation of an exemplary plot of an in-phase signal of the waveform of FIG. 7 as a function of a quadrature signal of the waveform generator component of the apparatus of FIG. 1.

Referring to FIG. 8, the plot 802 depicts the in-phase signal as function of the quadrature signal of FIG. 7. For example, the plot 802 depicts the distortion from the waveform generator component 104 as an effect on an amplitude 804 of the waveform analogous to the waveform 304. The plot 802 depicts the effect of the filters 604 and 606 on the in-phase signals and quadrature signals of the portion during the mode S waveform transition where the phase is changed from 0 to 180 degrees while the amplitude 804 is constant. The filters 604 and 606 in one example cause the amplitude 804 to decrease to a lower amplitude value 806. Now is presented an exemplary equation 808 representative of an illustrative relationship between amplitude ("A"), in-phase ("I"), and quadrature ("Q").

$$A = \sqrt{I^2 + Q^2}$$

Figure 9:
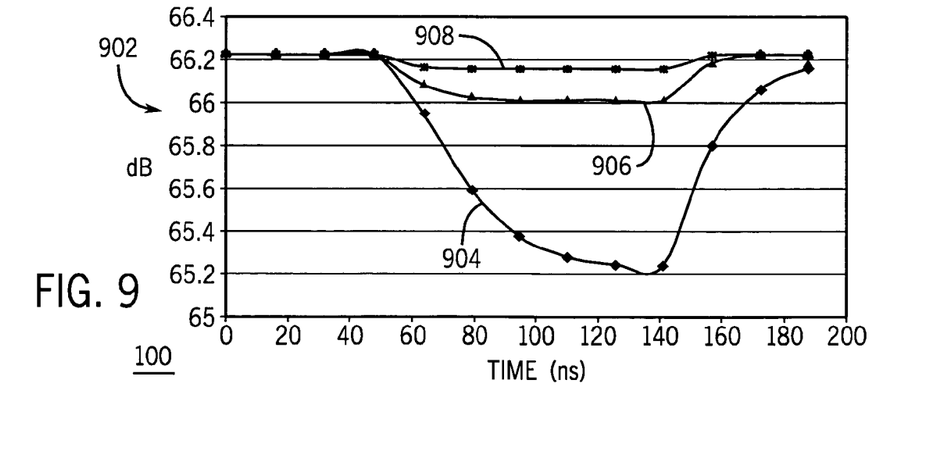
FIG. 9 is a representation of an exemplary a plot of an effect of one or more filters of the modulator of the apparatus of FIG. 1 on a change in amplitude over time for the waveform of FIG. 7 during a phase transition.

Referring to FIG. 9, the plot 902 depicts one or more effects of the filters 604 and 606 on a change in amplitude over time for a part of the mode S waveform during the phase transition in decibels ("dBs") versus nanoseconds of FIG. 7. The filters 604 and 606 may comprise one or more cutoff frequencies 904, 906, and 908. For example, the cutoff frequencies 904, 906, and 908 comprise 10 MHz, 20 MHz, and 30 MHz cutoff frequencies respectively. In one example, the filters 604 and 606 cause an amplitude value to be changed during a phase transition where the amplitude change is greater when the cutoff frequency is lower, for example cutoff frequency 904. In another example, higher cutoff frequencies, for example cutoff frequencies 906 and 908, create less distortion of the waveform analogous to the waveform 304. For example, the higher cutoff frequencies may not provide sufficient attenuation of the 64 MHz sampling clock of the waveform generator component 104 at the waveform analogous to the waveform 304.

The waveform generator component 104 employs one or more pre-emphasis correction factors to correct one or more negative effects of the filters 604 and 606. The filters 604 and 606 in one example may comprise a single pole RC filter. For example, the filters 604 and 606 cause a decrease in the amplitude of the waveform analogous to the waveform 304. The waveform generator component 104 in one example employs a sequencer 512 to select one or more parts of the waveform from the I–Q corrected transition segments table 510. The waveform generator component 104 employs one or more pre-emphasis correction factors ("$K_4$") to convert the I–Q corrected transition segments table 510 to the pre-emphasis corrected transition segments table 514. For example, the pre-emphasis corrected transition segments table 514 in one example determines one or more of a phase and an amplitude of the waveform analogous to the waveform 304 through employment of one or more of an in-phase control signal ("$I_4$") and a quadrature control signal ("$Q_4$"). Now are presented exemplary equations representative of an illustrative relationship between the one or more of the in-phase control signal, the quadrature control signal of the pre-emphasis corrected transition segments table 514.

The relationship between the cutoff frequency $F_c$ and the time constant value RC is given (for a single pole low pass filter) as:

$$RC = \frac{1}{2\pi F_C}$$

At time i the filters 604 and 606 are charged with a value $V_i$. When a new value, $V_{C(i)}$ is applied to the filter at time i+1 the filters 604 and 606 are only charged to a new value $V_{i+1}$ where:

$$V_{i+1} = V_i + (V_{C(i+1)} - V_i)(1 - e^{-\frac{\Delta t}{RC}})$$

In order for the filter to reach the required value $V_{C(i+1)}$ within the sampling time $\Delta t$, the filters 604 and 606 should be charged to a larger value such that $\Delta V_{i+1}$ is added to the filter to reach the required value $V_{C(i+1)}$ as shown:

$$V_{C(i+1)} = V_i + (V_{C(i+1)} + \Delta V_{i+1} - V_i)((1 - e^{-\frac{\Delta t}{RC}})$$

This equation is solved for the added value $\Delta V_{i+1}$:

$$\Delta V_{i+1} = (V_{C(i+1)} - V_i)\frac{e^{-\frac{\Delta t}{RC}}}{1 - e^{-\frac{\Delta t}{RC}}} = (V_{C(i+1)} - V_i) * K_4$$

Where the pre-emphasis correction factor $K_4$ is given as:

$$K_4 = \frac{e^{-\frac{\Delta t}{RC}}}{1 - e^{-\frac{\Delta t}{RC}}}$$

Thus, for one or more steps, the larger value can be calculated to reduce the distortions of the low pass filter:

$$V_{CNew(i+1)} = V_{C(i+1)} + \Delta V_{(i+1)}$$

In the above equations, R=resistance, C=capacitance, $V_C$=unfiltered amplitude value, $V_i$=filtered amplitude value, and $K_4$=pre-emphasis correction factors. In one example, where the waveform generator component 104 does not employ the pre-emphasis correction factors, the amplitude of the waveform ($V_i$) is less than a required amplitude ($V_C$). Where there are no limits on the amplitude, $V_i = V_C$, the waveform generator component 104 employs the pre-emphasis correction factors to convert the I–Q corrected transition segments table 510 to the pre-emphasis corrected transition segments table 514.

Figure 10:
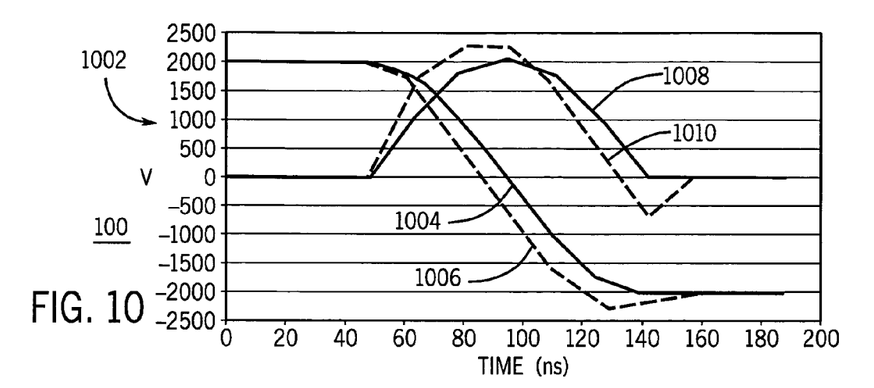
FIG. 10 is a representation of an exemplary plot of an effect of an employment of one or more pre-emphasis correction factors on the waveform of FIG. 7

Referring to FIG. 10, the plot 1002 depicts one or more effects of an employment of the pre-emphasis correction factors by the waveform generator component 104 on the waveforms of FIG. 7. For example, the waveform generator component 104 employs the pre-emphasis correction factors to correct one or more negative effects of the low pass filters 604 and 606. The plot 1002 depicts the effect of the correction factors on one or more of an in-phase signal and a quadrature signal of the waveforms in volts versus nanoseconds. The filters 604 and 606 in one example comprise a low-pass filter with a cutoff frequency of 10 MHz. In one example, the waveform generator component 104 employs the pre-emphasis correction factors to reduce one or more values 1004 of one or more in-phase signals of the waveform to one or more lower values 1006 of the in-phase signals. In another example, the waveform generator component 104 employs the pre-emphasis correction factors to increase the amplitude of a quadrature signal 1008 of the waveform to a higher amplitude of a quadrature signal 1010.

Figure 11:
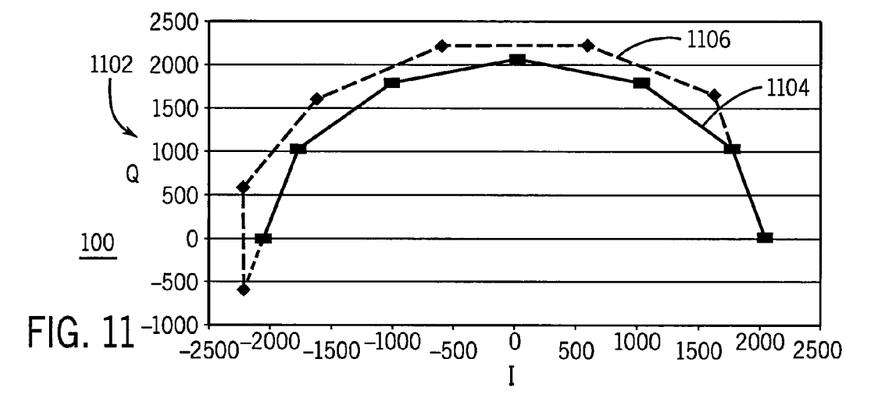
FIG. 11 is a representation of an exemplary plot of an effect of an employment of one or more pre-emphasis correction factors by the waveform generator component of the apparatus of FIG. 1 on an in-phase signal and a quadrature signal for the waveform of FIG. 7 during a phase transition.

Referring to FIG. 11, the plot 1102 depicts one or more effects of an employment of the pre-emphasis correction factors by the waveform generator component 104 on the in-phase signals and the quadrature signals for the part of the mode S waveform during the phase transition of FIG. 7. The employment of the pre-emphasis correction factors causes an amplitude of a quadrature signal 1004 of the waveform to increase to a higher amplitude of a quadrature signal 1106.

Figure 12:
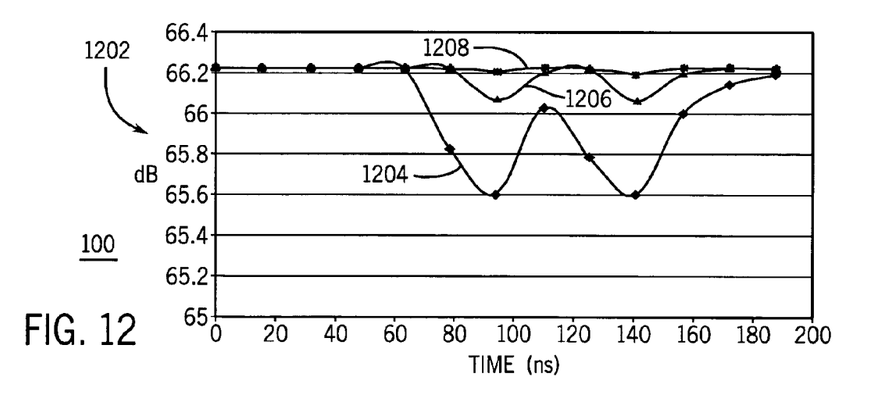
FIG. 12 is a representation of an exemplary plot of an effect of an employment of one or more pre-emphasis correction factors by the waveform generator component of the apparatus of FIG. 1 on a change in amplitude over time for the waveform of FIG. 7 during a phase transition.

Referring to FIG. 12, the plot 1202 depicts one or more effects of an employment of the pre-emphasis correction factors by the waveform generator component 104 on a change in amplitude (dB) over time for the part of the mode S waveform during the phase transition in dB versus nanoseconds of FIG. 7. The waveform generator component 104 applies the pre-emphasis correction factors to the waveforms 904, 906, and 908 to create the waveforms 1204, 1206, and 1208 respectively. The employment of the pre-emphasis correction factors causes one or more amplitude values of the waveforms 1204, 1206, 1208 to increase closer to one or more original amplitude values of the waveforms 904, 906, and 908 respectively.

The apparatus 100 in one example employs one or more computer-readable signal-bearing media. Examples of a computer-readable signal-bearing medium for the apparatus 100 comprise the recordable data storage medium 118 of the processor component 102 and the waveform generator component 104. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A radar apparatus, comprising:
a programmable waveform generator component includes a control component that generates a waveform, wherein the control component employs a plurality of waveform portions to form the waveform; and
one or more modulators coupled to the generator component that receive the waveform from the generator component and transmit a signal with controlled phase and amplitude based on the waveform to an antenna.

2. The apparatus of claim 1, wherein the programmable waveform generator component comprises a memory component;
wherein the memory component stores one or more of the plurality of waveform portions;
wherein the control component obtains one or more of the one or more of the plurality of waveform portions from the memory component, wherein the control component combines the one or more of the one or more of the plurality of waveform portions to form the waveform.

3. The apparatus of claim 2, wherein the memory component comprises a first memory component, wherein the programmable waveform generator component comprises the first memory component and a second memory component;
wherein the second memory component stores one or more instructions, wherein the control component accesses one or more of the one or more instructions from the second memory component, wherein the control component employs the one or more instructions to make a determination of the one or more of the one or more of the plurality of waveform portions to add to the waveform from the first memory component.

4. The apparatus of claim 1, wherein the programmable waveform generator component comprises a signal processor component, wherein the signal processor component corrects one or more distortions in one or more of the phase and the amplitude of one or more of the one or more parts of the waveform.

5. The apparatus of claim 4, wherein the signal processor component corrects the one or more distortions in the one or more of the phase and the amplitude through an application of a multiplication to the one or more of the one or more parts of the waveform.

6. The apparatus of claim 4, wherein the one or more distortions comprise one or more non-linearities of the one or more of the one or more parts of the waveform, wherein the signal processor component corrects the one or more non-linearities through a multiplication of the one or more of the one or more parts of the waveform by a linearization factor.

7. The apparatus of claim 4, wherein the one or more distortions in the one or more of the phase and the amplitude of the one or more of the one or more parts of the waveform comprise a DC offset in the one or more of the phase and the amplitude of the one or more of the one or more parts of the waveform, wherein the programmable waveform generator component creates the DC offset upon an analog to a digital conversion of the one or more of the one or more parts of the waveform;
wherein the signal processor component employs one or more correction factors to promote reduction of the DC offset for correction of the one or more of the one or more parts of the waveform.

8. The apparatus of claim 4, the apparatus further comprising:
one or more filters, wherein one or more of the one or more filters cause the one or more distortions;
wherein the signal processor component detects the one or more distortions, wherein the signal processor component calculates one or more correction factors based on the one or more distortions.

9. The apparatus of claim 8, wherein the signal processor component corrects the one or more distortions through an addition of the one or more correction factors to the one or more of the one or more parts of the waveform.

10. The apparatus of claim 1, the apparatus further comprising:
one or more modulators, wherein the programmable waveform generator component outputs the one or more parts of the waveform to one or more of the one or more modulators;
wherein the one or more of the one or more modulators transmit a signal based on one or more of the one or more parts of the waveform to an antenna.

11. The apparatus of claim 1, wherein the programmable waveform generator component employs one or more of an in-phase signal and a quadrature signal to make a determination of one or more of the phase and the amplitude of the one or more parts of the waveform.

12. The apparatus of claim 1, wherein the programmable waveform generator component comprises an identification friend or foe interrogator.

13. A method for generating a radar signal, comprising the steps of:
generating one or more parts of a waveform by a programmable waveform generator component; and
controlling one or more values of one or more of an in-phase signal and a quadrature signal to generate one or more of the one or more parts of the waveform
wherein the programmable waveform generator component comprises a control component, wherein the step of generating the one or more parts of the waveform by the programmable waveform generator component comprises the steps of:
requesting a plurality of waveform portions at the control component; and
forming the waveform through employment of the plurality of waveform portions.

14. The method of claim 13, wherein the programmable waveform generator component comprises a first memory component and a second memory component, wherein the step of requesting the plurality of waveform portions at the control component comprises the steps of:
employing one or more instructions stored at the second memory component to obtain one or more of the plurality of waveform portions from the first memory component;
sending one or more of the one or more of the plurality of waveform portions to the control component from the first memory component; and
connecting the one or more of the one or more of the plurality of waveform portions to form the waveform.

15. The method of claim 13, wherein the programmable waveform generator component comprises a signal processor component, wherein the step of controlling the one or more values of the one or more of the in-phase signal and the quadrature signal to generate the one or more of the one or more parts of the waveform comprises the steps of:
determining one or more correction factors based on one or more distortions of the one or more of the one or more parts of the waveform; and correcting for one or more of the one or more distortions of the one or more of the one or more parts of the waveform through employment of one or more of the one or more correction factors at the signal processor component.

16. The method of claim 13, wherein the step of controlling the one or more values of the one or more of the in-phase signal and the quadrature signal to generate the one or more of the one or more parts of the waveform comprises the steps of:
   making a determination of one or more of a phase and an amplitude of a radio frequency signal through employment of the one or more of the in-phase signal and the quadrature signal of the one or more of the one or more parts of the waveform; and
   sending the one or more of the one or more parts of the waveform to a modulator for creation of the radio frequency signal.

17. An article, comprising:
   one or more computer-readable signal-bearing media;
   means in the one or more media for generating one or more parts of a radar waveform by a programmable waveform generator component; and
   means in the one or more media for controlling one or more values of one or more of an in-phase signal and a quadrature signal to generate one or more of the one or more parts of the waveform
   wherein the means in the one or more media for generating the one or more parts of the waveform by the programmable waveform generator component comprise:
   means in the one or more media for making a determination of one or more of a phase and an amplitude of a radio frequency signal through employment of the one or more of the in-phase signal and the quadrature signal of the one or more of the one or more parts of the waveform; and
   means in the one or more media for sending the one or more of the one or more parts of the waveform to a modulator for creation of the radio frequency signal.
   means in the one or more media for generating one or more parts of a radar waveform by a programmable waveform generator component; and
   means in the one or more media for controlling one or more values of one or more of an in-phase signal and a quadrature signal to generate one or more of the one or more parts of the waveform.

* * * * *